Feb. 15, 1938.                H. M. ROCKWELL                 2,108,411
                         AIRCRAFT AND ENGINE THEREFOR
                             Filed July 24, 1933           3 Sheets-Sheet 1
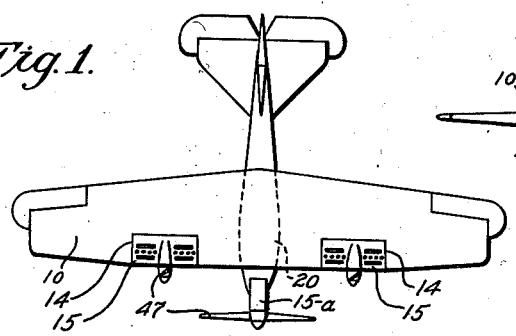
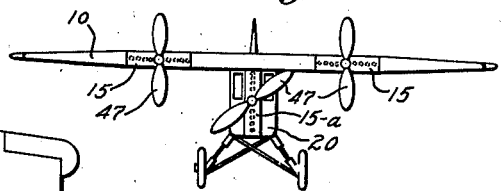
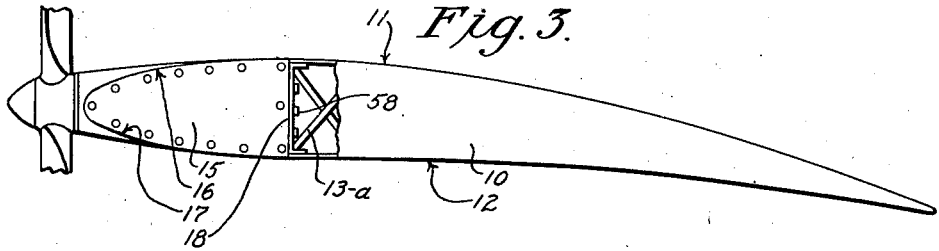
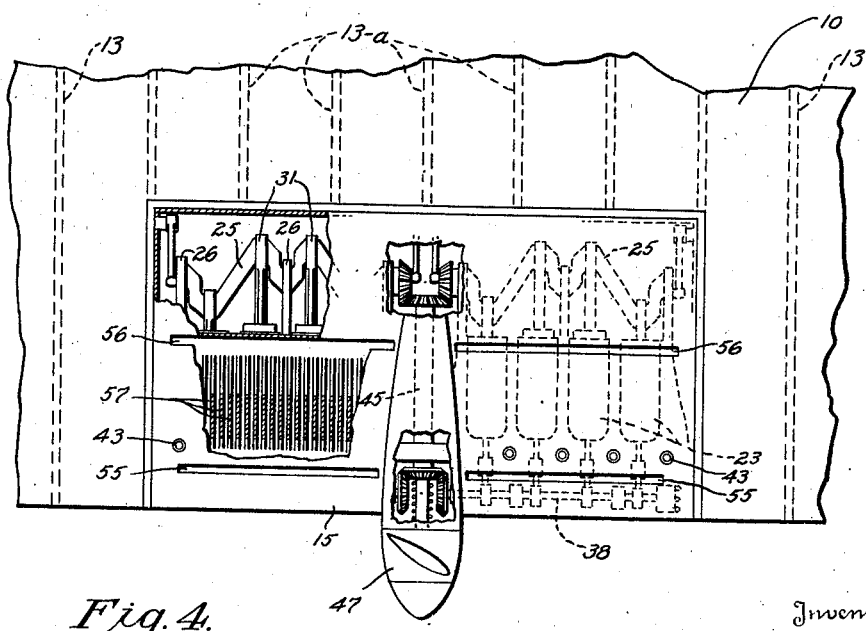
Inventor
Hugh M. Rockwell
By George L. Ljungbf
Attorney

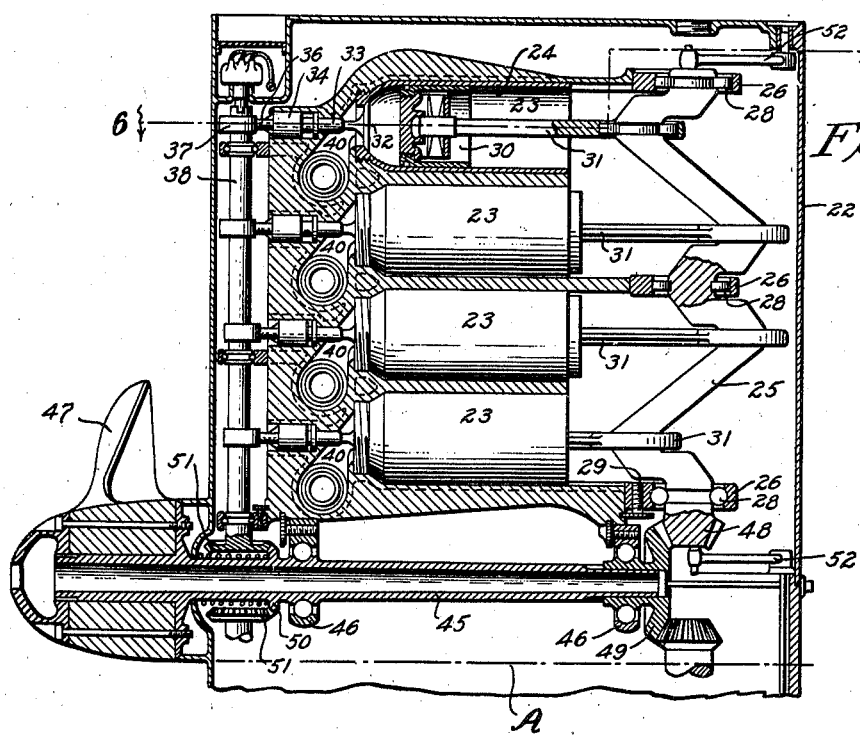
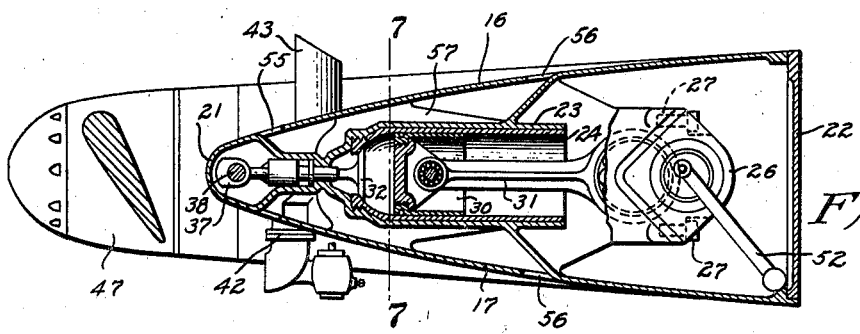
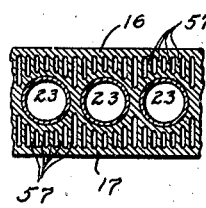
Inventor
Hugh M. Rockwell
By George L. Ljungloff
Attorney

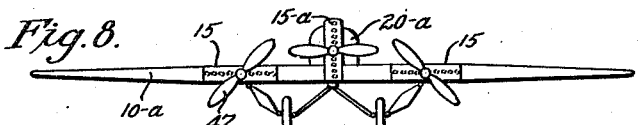
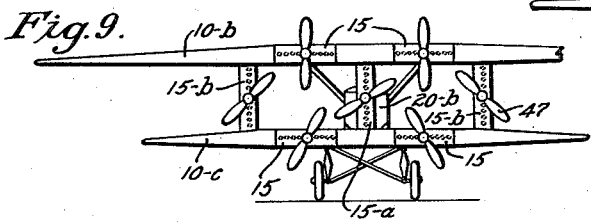
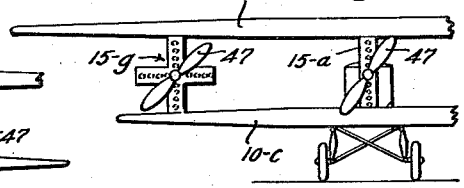
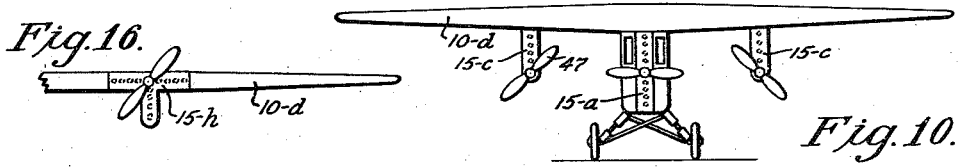
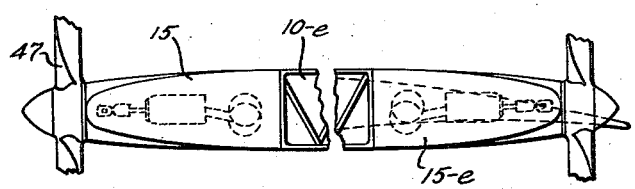
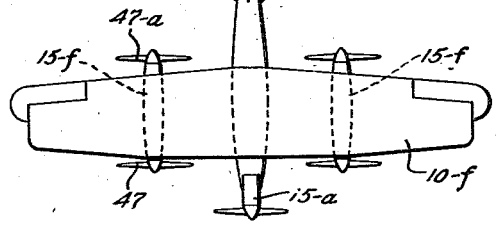
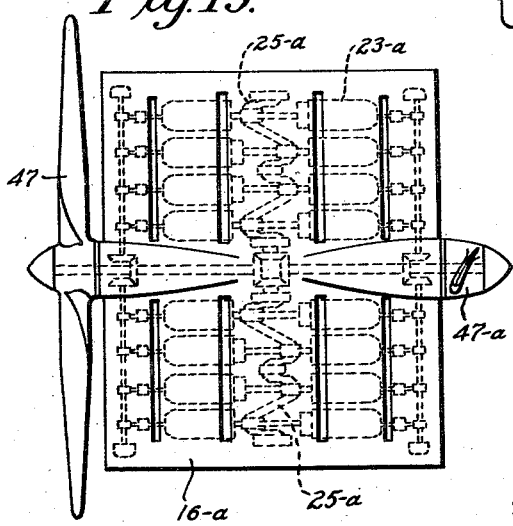
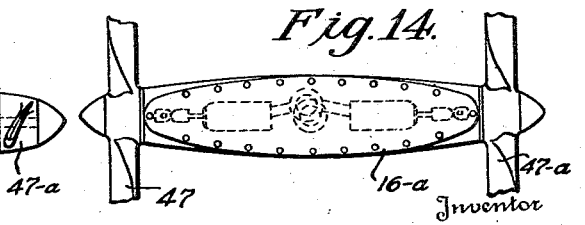

Patented Feb. 15, 1938

2,108,411

UNITED STATES PATENT OFFICE 2,108,411

AIRCRAFT AND ENGINE THEREFOR

Hugh M. Rockwell, Freeport, N. Y.

Application July 24, 1933, Serial No. 682,020

6 Claims. (Cl. 244—55)

This invention relates to aircraft and engines therefor, and it refers more particularly to aircraft of the heavier-than-air type, and to aircooled internal combustion engines for such craft.

The invention is concerned chiefly with the solution of three major problems of aviation, namely, reduction in power plant weight, reduction of head resistance or resistance to flight, and improved uniform cooling of the power plant. It is well recognized that the cylinders of internal combustion engines can be effectively cooled by the circulation of water through surrounding water jackets, but so far as aviation is concerned, such engines are undesirable because the water cooling system, which includes a large radiator and circulation pump, together with the water contained in the system, necessarily adds considerable weight to the complete machine. Hence the preference of those skilled in the art inclines more favorably toward engines of the air-cooled type.

Air-cooled engines which have been used prior to this invention may be divided into two general classes: (1) those in which the cylinders are arranged in line; (2) those in which the cylinders are disposed radially about a central crank shaft. In both of these types, the cylinders, as is well known, are provided with external cooling fins whereby to increase the cooling surfaces to conduct the heat away from the cylinder walls. Also, in engines of these types, the propellers have usually been mounted directly upon the ends of the crank shafts, which necessarily extend in fore-and-aft direction.

These engines in which the cylinders have been arranged in line (either in a single line or in what is known as the V type) have offered considerable resistance to flight of the aeroplanes in which they have been mounted, and have not been capable of uniform cylinder cooling. Obviously, with such arrangements the front half of the foremost cylinder is cooled much more effectively than the corresponding half of any of the other cylinders, and the rearward half of each cylinder is cooled less than the forward half of the corresponding cylinder. In the well-known radial air-cooled engines, the same objection prevails, in that the front half of each cylinder is cooled much more effectively than the rear half. This difference in cooling effect naturally induces serious stresses and strains, due to unequal expansion and contraction of the parts, complicating the problems of engine design to a considerable extent.

The radial air-cooled engines are necessarily quite massive, some of them measuring six feet or more in diameter and as a result they offer a very substantial resistance to the forward flight of the aeroplanes in which they are mounted. In fact, in some installations these radial engines have been so large that when mounted in the forward end of the fuselage, they have completely cut off the pilot's view in a forward direction.

An object of the present invention is to provide an aeroplane engine having a compact arrangement of parts offering a minimum of resistance to flight of the plane.

Another object is to provide such an engine which can be mounted in an aeroplane without necessity for the usual struts of the prior art.

Another object is to provide such an engine wherein the cylinders will be uniformly cooled.

Another object is to provide such an engine in which the maximum cooling effect is obtained at the hottest portions of the cylinders.

Another object is to provide such an engine with a stream-line casing which will contribute to the dynamic effect of the whole aeroplane.

Another object is to provide such an engine which may be built into an aeroplane wing as a part of the entering edge thereof.

Another object is to provide such an engine which may serve as a strut in connecting together the upper and lower wings of a biplane.

Another object is to provide such an engine which is of extremely simple construction, strong and durable in service, efficient in operation, and a substantial advance in the art.

More specifically the invention contemplates an internal combustion engine having a plurality of laterally alined cylinders disposed in a common plane and enclosed in a casing of stream-line contour. In one adaptation the common plane of the cylinders is substantially horizontal so that the engine can be set into an aeroplane wing and form a part of the entering edge thereof, the upper and lower surfaces of the engine casing being substantially continuous with those of the wing. In another adaptation, the common plane of the cylinders is substantially vertical so that the engine may be disposed in the nose of a fuselage, or either above or below a wing of a monoplane, or as a strut connecting the two wings of a biplane. The cylinders of the engine extend in a fore-and-aft direction within the casing, with their head ends preferably facing forwardly, and are connected to the casing by a plurality of spaced longitudinally extending fins which conduct the heat away from the cylinder walls. Apertures are provided in the casing for induction and eduction of cooling air which circulates between the cylinders and the walls of the casing.

The foregoing and other objects, features, and advantages of the invention will become apparent as the following description progresses in connection with the accompanying drawings, wherein several embodiments and adaptations of the invention are shown by way of illustration, and wherein Figure 1 is a top plan view of an aeroplane equipped with engines in accordance with this invention;

Fig. 2 is a front view of the same;

Fig. 3 is an end view, on a larger scale, of the wing of the plane in Fig. 1 and partly broken away to show one of the novel engines mounted in the entering edge thereof;

Fig. 4 is a fragmentary plan view on a larger scale and showing more clearly how the engine is mounted in the wing;

Fig. 5 is a fragmentary longitudinal sectional view through the engine per se in the common plane of its cylinders;

Fig. 6 is a sectional view taken on the line 6—6 of Fig. 5;

Fig. 7 is a fragmentary transverse sectional view taken on the line 7—7 of Fig. 6;

Fig. 8 is a front view of another type of monoplane equipped with engines in accordance with the invention;

Fig. 9 is a front view of a multi-motored biplane with some of the novel engines serving as struts to connect the two wings;

Fig. 10 is a front view of another monoplane and showing a different application of the novel engines of this invention;

Fig. 11 is a fragmentary view similar to Fig. 3, but showing one of the novel engines arranged in the trailing edge of the wing as well as in the entering edge;

Fig. 12 is a top plan view of another aeroplane showing a further modification of the invention;

Fig. 13 is a side elevation, on a larger scale, of one of the strut motors of the plane in Fig. 12;

Fig. 14 is a plan view of the motor shown in Fig. 13;

Fig. 15 is a fragmentary front view of a biplane equipped with another form of engine embodying the invention; and Fig. 16 is a similar view of a monoplane with still another form of the invention.

Referring now particularly to Figs. 1 to 4 inclusive of the drawings it will be seen that the invention has been shown as embodied in a monoplane which includes a wing 10 having upper and lower surfaces 11 and 12 spaced apart to provide a relatively deep section, and fabricated in the usual manner with a plurality of spaced braces or ribs 13 and 13—a which extend in a fore-and-aft direction. At one or more suitable points, the entering edge of the wing is cut out as at 14 for the reception of an engine 15, having a stream-line casing, the upper and lower surfaces 16 and 17 of which are respectively continuous with the wing surfaces 11 and 12. The engine 15 is a complete, self-supporting unit which is secured directly to and in the wing 10, taking the place of the cut-away forward ends of the braces or ribs 13—a, and because of its stream-line casing it not only minimizes the head resistance of the plane, but it contributes to the dynamic effect of the wing. The base portion 18 of the engine casing is of substantially the same depth as the wing, and in view of its securement to a plurality of the ribs, its weight is well distributed, and at the same time it serves to tie the ribs or braces together in a rigid structure.

The monoplane shown in Figs. 1 and 2 is trimotored, having two of the engines 15 disposed in the entering edge of the wing and equidistantly spaced at opposite sides of the longitudinal center of the plane, and a similar motor 15—a disposed in the nose of the fuselage 20. While the engines 15 and 15—a are substantially alike in details of construction, they are differently mounted to the extent that the common planes of their cylinders are perpendicular to each other. In other words, the cylinders of the engines 15 are disposed in a common plane which is substantially horizontal, while the cylinders of the engine 15—a are disposed in a common plane which is substantially vertical. The advantages of such novel arrangements will be more fully appreciated as the description proceeds.

Structural details of the novel engine are shown in Figs. 4 to 7 inclusive, from which it will be seen that the engine casing previously referred to is rectangular in plan view and substantially semi-elliptical in longitudinal section, its upper and lower surfaces 16 and 17 being connected together at the front by a relatively narrow rounded end wall 21. The other end of the casing is closed by a removable plate 22 which gives access to the crank shaft end of the casing. Cast integrally with or otherwise secured within the stream-line casing are a plurality of power cylinders 23, each of which is lined with a thin steel shell 24. The cylinders are arranged parallel with each other in side-by-side relation and all in a common plane coincident with that of the major axis of the casing, and with their head ends directed toward the curved narrow end 21 of the casing. A crank shaft 25 is mounted in bearings 26 in the wide end of the casing, each of such bearings comprising an apertured block having a right angle portion fitting into a portion of the casing and held in position by bolts 27. Between the surface of each aperture and the coacting portion of the crank shaft are arranged anti-friction members 28. Three of these bearings 26 are shown in Fig. 5, the lowermost one having steel balls as the anti-friction members 28, such balls running in grooved raceways, while in the other two bearings 26 the anti-friction members are rollers for which grooves are provided only in the crank shaft. There the ball bearing locates the crank shaft axially. The position of the ball bearing may be adjusted by means of a set screw 29 having a head which fits in a slot provided therefor in the main casting, and rotation of this set screw will move the bearing axially. To permit such movement of the bearing, the holes through which the clamping bolts pass are made elongated.

In each of the cylinders 23 there is provided a piston 30 which is connected to the crank shaft by means of the connecting rod 31. The connections between the connecting rod and the piston and between the connecting rod and the crank shaft include anti-friction rollers thereby permitting a slight lateral movement to the connecting rod, properly to center it. Of course, plain bearings may be employed throughout instead of the anti-friction bearings, if desired. Incidentally, the pistons 30 may be of any ordinary or preferred type.

As best shown in Figs. 5 and 6, the head of each cylinder is provided with a single valve 32, which will hereafter be termed the master valve and which controls both the inlet to and the exhaust from the cylinder. The valve stem extends through a sleeve 33 mounted in the head of the cylinder, and has threaded on its outer end a hollow cylindrical member 34. A coiled compression spring tends to force the member 34 axially outward and thus to bring the valve 32 properly to its seat. Each of these members 34 carries a small ball bearing 36, the outer race of which contacts with a cam 37 on a cam shaft 38 which is arranged parallel to the crank shaft and in the point of the elliptical casing.

In the casing near the camshaft there are provided a plurality of passageways 40 communicating with the cylinders and through which the fuel charge and exhaust gases pass to and from the cylinders. In each of these passageways there are provided an inlet port and an outlet port, the former communicating with the intake manifold 42 and the other communicating with an exhaust pipe 43. These inlet and outlet ports are controlled by valves which are not shown and which do not form any novel part of the present invention. Spring-pressed valves, not shown, are provided to control the flow of gases to the inlet and outlet ports in the passageways 40, such valves being actuated by differential fluid pressures on their opposite sides at certain points in the operating cycle. Obviously, other arrangements of valves may be used, however, if desired.

The cam shaft 38 is driven from the crank shaft 25 by means of a shaft 45 arranged parallel to the axes of the cylinders. This shaft is mounted in ball bearings 46 of the same character as the ball bearing 26 and projects beyond the end of the stream-line casing, and it has mounted on its outer end a propeller 47. The driving connections between the shafts 25, 38, and 45 include gears 48, 49, 50 and 51. At each end of the crank shaft there is provided an oil pump 52, these pumps being so arranged that at least one of them will be effective at all times irrespective of the position in which the engine may be arranged.

The cams 37 are so arranged that their respective master valves 32 are open during the exhaust and intake strokes of the pistons 30, and closed during the compression and explosion strokes. The other valves previously referred to will automatically open and close in proper synchronism with the valves 32, giving efficient operation of the engine with an extremely simple construction and arrangement of parts.

An important feature of the invention is the provision of novel means for effectively cooling all of the cylinders uniformly on all sides, said means including a special relationship between the cylinders and the stream-line casing. This arrangement is best shown in Figs. 4, 6, and 7. In the specific embodiment there illustrated, the cylinders are cast of aluminum alloy, and integral with the outer casing but spaced therefrom. This space between the cylinders and the casing is utilized for the circulation of cooling air which enters the casing through slots 55 forwardly of the head ends of the cylinders and which passes out of the casing through slots 56 adjacent the rear or crank ends of the cylinders. These slots 55 and 56 are formed in both the upper and lower walls of the casing and constitute induction and eduction ports, respectively, and in view of the fact that the cylinder heads are disposed forwardly, they will receive the maximum cooling effect of the air. By reason of the tapering width of the casing, and the disposition of the cylinders in the tapering part, the air passages referred to are narrowest at the head ends of the cylinders, producing a Venturi effect in the air passages, and such effect further enhances the efficiency of the cooling means. Between the slots 55 and 56 the casing walls are joined to the cylinder walls by a plurality of thin, longitudinally extending fins 57 which serve to strengthen the cylinder walls as well as to conduct the heat away therefrom. Thus it will be seen that the upper and lower surfaces of the stream-line casing are cooling surfaces as well as lifting surfaces, and that not only are all of the cylinders cooled equally, but each cylinder is cooled uniformly all the way around its periphery. This eliminates stresses due to unequal expansion and contraction and thus simplifies the engine design problems. Furthermore, by providing for maximum cooling in the head end of each cylinder, it is possible to obtain higher compression and thus to increase the power developed by the engine.

Obviously, the number of cylinders may vary in different engines in accordance with the desired mounting and power. The engine in Fig. 4 has been shown with eight cylinders arranged in two units of four each on opposite sides of the centrally disposed propeller shaft. Since both units are alike, only one of them has been shown in enlarged detail in Fig. 5. Besides, the invention is not limited to having two units on opposite sides of the propeller shaft, but contemplates also the use of a single unit with the propeller shaft either above or below it as will more clearly appear hereinafter. Such an arrangement would be like that in Fig. 5 with the exception that one side of the casing would terminate substantially at the dot-and-dash line A.

When the engine is mounted in the entering edge of an aeroplane wing as shown in Fig. 3, it may be attached in any desired manner as by bolts 58 or the like. Similarly, when mounted in the nose of the fuselage of a plane, the engine 15—a may be secured to the frame work of the fuselage. In the latter case, as has previously been pointed out, and as best shown in Fig. 2, the common plane of the power cylinders is vertical, and by reason of the narrow and compact arrangement of the engine the pilot within the fuselage will have a clear, unobstructed view forwardly of the ship. The engine 15—a will not contribute to the lifting surfaces as will the engine 15, but it will permit flight with a minimum of head resistance, and with the same uniform maximum cooling of the cylinders.

In Fig. 8 the invention has been shown as embodied in a low-winged monoplane wherein the wing 10—a is mounted below the fuselage 20—a. Two engines 15 are mounted in the entering edge of the wing, and a third motor 15—a in the nose of the fuselage 20—a. The previously enumerated advantages of the engine are present in this embodiment just as in the plane of Fig. 1, and need not be repeated here.

Another illustration of the invention is given in Fig. 9 wherein a biplane having an upper wing 10—b, and a lower wing 10—c, and a fuselage 20—b. The upper and lower wings 10—b and 10—c are each provided with two engines 15 in their entering edges and disposed at opposite sides of the longitudinal center of the aeroplane. Another engine 15—a, as previously described, is mounted in the nose of the fuselage 20—b. Additional similar engines 15—b are also shown as mounted between the wings 10—b and 10—c, disposed in substantially vertical planes and constituting struts for connecting and reinforcing the wings. The struts heretofore employed have contributed considerable head resistance in addition to that of the engines, but by the present invention such struts are eliminated and, at the same time, the engine resistance is reduced, the engines 15—b serving as struts and taking the loads directly through their crankcases. Thus it will be clear that particularly in large planes, greater motive power can be provided with less weight and less head resistance than in the use of prior art engines, and the improved aeroplanes will therefore have better weight distribution, greater lifting power, higher speed, and longer cruising radius than prior art aeroplanes.

It has previously been pointed out that the novel engine, in one form, may comprise only one series of cylinders with the propeller shaft at one side thereof and the outer casing terminated as on the line A in Fig. 5. Two such engines 15—c are shown in Fig. 10 as suspended from the wing 10—d of an aeroplane. In this adaptation, the engines are secured directly to the lower side of the wing without requiring special braces or other extraneous fastening means, but the engine cylinders extend in a fore-and-aft direction and have the same advantageous cooling features as in the other embodiments.

In some cases, the head ends of the cylinders may be disposed rearwardly instead of forwardly. One such installation is shown in Fig. 11 wherein one engine 15 is set into the entering edge of the wing 10—e, and another engine 15—e is set into the trailing edge of the wing, each engine driving its own propeller. In mounting the engine in the trailing edge of the wing, the base of the engine case may be of substantially the same depth as the wing, while the nose of the rear edge of the casing may be slightly thicker than the trailing edge of the wing. Of course, the propeller driven by the engine 15 is of the "puller" type, while that driven by the engine 15—e is of the "pusher" type.

Another modified arrangement is shown in Figs. 12 to 14 inclusive. Here there are two vertically arranged engines 15—f secured to the lower side of the wing 10—f in addition to the engine 15—a in the nose of the fuselage. Each engine 15—f has two sets of opposed cylinders 23—a and two crankshafts 25—a mounted within a single casing 16—a, and there is a propeller 47 of the "puller" type on the forward end of the engine, and another propeller 47—a of the "pusher" type on the rearward end of the engine. The wing 10—f may be that of a monoplane as in Fig. 10, or it may be the upper wing of a biplane as in Fig. 9, in which case the two engines 15—f will serve as struts connecting the two wings and taking the full loads through their casings.

In some cases, the engines may comprise four sets of cylinders as shown at 15—g in Fig. 15, all of the cylinders having the head ends facing forwardly in a cruciform casing. In such an engine, some of the cylinders will be alined in a vertical plane and others in a horizontal plane, but all with the same air-cooling features heretofore described. The cruciform engine is more specifically disclosed and claimed in my application Serial No. 294,960, filed July 24, 1928, to which reference may be had for further details.

Still another form of the invention is shown in Fig. 16, wherein the novel engine 15—h is substantially T-shaped with three alined sets of cylinders, two sets of which are horizontally disposed and set into the entering edge of a monoplane wing, and the other set being vertically disposed and depending below the wing. In this form of the invention, as in all the others, the cylinders are disposed in a fore-and-aft direction with their head ends facing forwardly and all enclosed in a stream-line casing which is apertured for the passage of cooling air currents.

From the foregoing it will be evident that a substantial advance has been made in the art by providing an aeroplane in which one or more novel engines constitute integral parts of the air foil. The engines are effectively air cooled both within and outside the casing, and they do not add any considerable head resistance. When mounted as in the wings, the engines contribute to the lifting surfaces of the ships. Obviously, the invention is susceptible of further modifications in the details of construction and arrangement of parts, and the right is herein reserved to make such changes as fall within the scope of the appended claims without departing from the spirit of the invention.

This application is a consolidation and refiling of my earlier applications identified as follows:

Ser. No. 101,038, filed Apr. 10, 1926, Ser. No. 271,723, filed Apr. 21, 1928, and Ser. No. 271,724, filed Apr. 21, 1928.

What I claim is:—

1. In or for an aeroplane, a wing having a deep section and having a portion of its entering edge removed, and an air-cooled internal combustion engine filling the gap left by said removed portion, said engine having a crank case, portions of which are substantially continuous with the upper and lower surfaces of the wing, and having a plurality of parallel cylinders with their head ends facing into the slipstream.

2. In or for an aeroplane, a wing having a deep section, and having a portion of its entering edge removed, and an air-cooled internal combustion engine filling the gap left by said removed portion, said engine having a crank case, portions of which are substantially continuous with the upper and lower surfaces of the wing, and having a plurality of parallel cylinders disposed in a substantially horizontal common plane, and having their head ends facing into the slipstream, said engine casing contributing substantially to the lifting effect of the wing and serving effectively to cool the cylinders of the engine.

3. In or for an aeroplane, a wing, an air-cooled internal combustion engine secured thereto, said engine having a plurality of parallel cylinders in a common plane which is at an angle to the wing and with their head ends disposed forwardly, a stream-line casing surrounding the cylinders and spaced therefrom, said casing being joined to the cylinders by longitudinally extending fins, and being apertured to permit circulation of cooling air between the walls of the casing and cylinders, and between said fins, and a propeller shaft driven by the engine and extending substantially in a fore-and-aft direction.

4. In or for an aeroplane, a wing, an air-cooled internal combustion engine having a plurality of alined cylinders extending fore and aft, the engine having a unitary streamline casing surrounding the cylinders and secured directly to the wing to support the engine, said casing defining between itself and the cylinders, passages for air currents for cooling the cylinders, a propeller shaft driven by the engine and extending parallel to the cylinders, and propellers mounted on the opposite ends of the shaft respectively in front and in back of the wing.

5. An air-cooled internal combustion engine comprising a plurality of alined cylinders extending fore-and-aft, a stream-line casing surrounding the cylinders and spaced therefrom, said casing being joined to the cylinders by longitudinally extending fins, and being apertured to permit circulation of cooling air between the walls of the casing and cylinders and between said fins, and a propeller shaft driven by the engine and extending parallel to the cylinders.

6. In an aeroplane, the combination with a wing having a deep section, of an air-cooled engine comprising a plurality of laterally alined cylinders disposed in a substantially horizontal plane and having their head ends disposed forwardly, a stream-line casing surrounding the cylinders and spaced therefrom, said casing being joined to the cylinders by longitudinally extending fins, and being apertured to permit circulation of cooling air between the cylinders and casing and between said fins, the casing being set into and secured to the wing and being so formed that its upper and lower surfaces will be continuous with those of the wing whereby to contribute to the lifting of the aeroplane, and a propeller shaft driven by the engine and extending in a fore-and-aft direction.

HUGH M. ROCKWELL.